Jan. 15, 1929.  L. ROTOLE  1,699,023
LICENSE PLATE
Filed Sept. 17, 1926
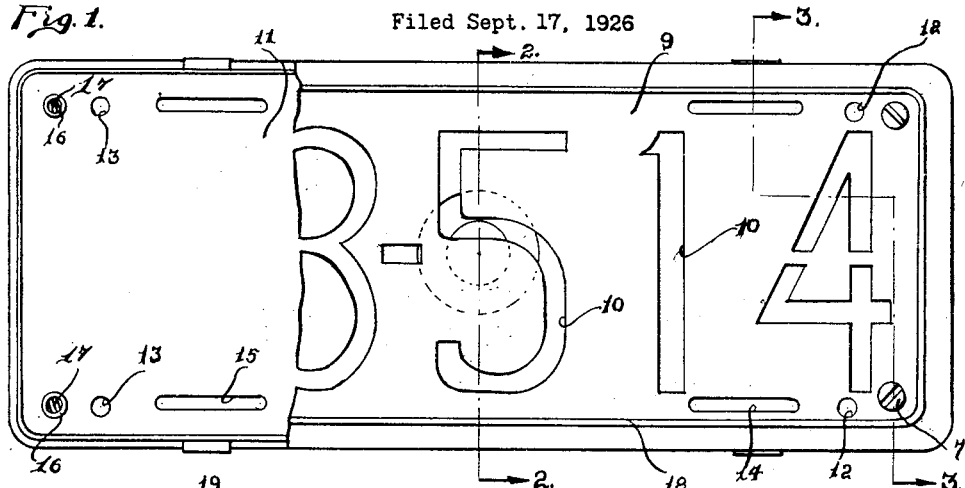
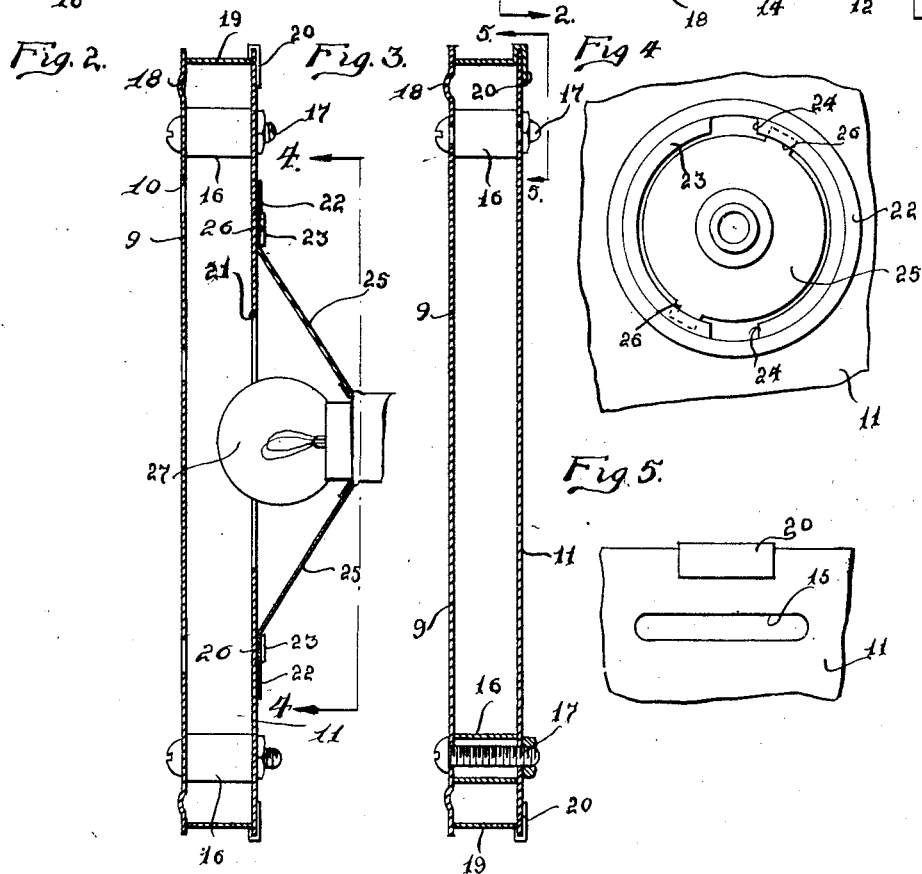
INVENTOR.
Leo Rotole
BY
ATTORNEY.

Patented Jan. 15, 1929.

1,699,023

UNITED STATES PATENT OFFICE.

LEO ROTOLE, OF DETROIT, MICHIGAN.

LICENSE PLATE.

Application filed September 17, 1926. Serial No. 136,087.

My invention relates to a new and useful improvement in a license plate, and has for its object the provision of a license plate and support therefor arranged and constructed so as to render the license numbers appearing on the license plate visible at all times. When driving long distances, and especially over dusty roads, the license plate becomes coated with dust to such an extent that the license numbers are illegible, and the present invention eliminates this objectionable feature.

It is another object of the invention to provide a license plate support so arranged that the same may be illuminated when desired.

Another object of the invention is the provision of a license plate support having an opening formed in the rear thereof and provided with novel means for affixing a closure therefor regardless as to whether the closure carries a light bulb or not.

Other objects will appear hereinafter.

The invention consists in the combination and arrangement of parts hereinafter described and claimed.

The invention will be best understood by a reference to the accompanying drawings which form a part of this specification and in which, Fig. 1 is a front elevational view of the invention with a part broken away.

Fig. 2 is a sectional view taken on substantially line 2—2 of Fig. 1.

Fig. 3 is a sectional view taken on substantially line 3—3 of Fig. 1.

Fig. 4 is a fragmentary rear elevational view taken on substantially line 4—4 of Fig. 2.

Fig. 5 is a fragmentary rear elevational view taken on substantially line 5—5 of Fig. 3.

As illustrated in the drawings, I have provided a license plate 9 having perforations 10 formed therein in the shape of the license numbers. This plate is adapted for attachment to a suitable supporting plate 11, the supporting plate being mounted on the vehicle in any desired manner, registering openings 12 and 13 being formed in the plate 9 and the supporting plate 11 respectively, from which bolts may be projected for attaching the plate and support to the vehicle. Similar registering slots 14 and 15 are provided in the Plate 9 and the supporting plate 11 respectively for the projection of straps therethrough, should it be desired to fasten the license plate to the vehicle by means of straps. The supporting plate 11 is spaced from the license plate 9 by spacing sleeves 16, through which are projected suitable bolts 17. The license plate is provided around its edges within its marginal limits with a bead 18, and engaging between the supporting plate and the license plate 9 within the marginal limits of these plates and outwardly from the bead 18 is a wall forming strip 19 which extends around the four sides of the plates 9 and 11, and serves to form with these plates a housing. This strip 19 is provided with integral tongues 20 which are adapted for bending over the plate 11 to retain the strip 19 in position. If desired, this strip may be dispensed with, and it is evident that due to the method of fastening the same, it may be removed and replaced at will with very little trouble. Formed in the supporting plate 11, preferably centrally thereof, is an opening 21 and mounted on the rear of the plate 11 surrounding the opening 21 is a strip of metal 22, the inner portion 23 of which is loose and outwardly offset from the support 11 so as to provide with the supporting plate 11 a channel. As shown in Fig. 4, this outwardly offset portion 23 is provided with notches 24. A closure 25 is provided for the opening 21, this closure 25 having outwardly projecting tongues 26 which are positioned preferably diametrically of each other, the notches 24 being also diametrically positioned so that the tongues 26 may engage in the notches 24, and upon a turning of the closure 25 the tongues 26 be brought into the channel between the portion 23 and the supporting plate 11, thus serving to lock the closure 25 in position. It is believed evident that this closure 25 may be used solely as a closure or as a support for a light bulb 27 so that, when desired, the license plate may be illuminated, the light from the light bulb 27 shining through the openings 10.

In this way I have provided a license plate which will prevent the display mounted thereon from becoming obscure by dust and other foreign material adhering thereto, and at the same time one which may be illuminated so as to be visible in the night time. It will be noted that the openings 10 are positioned above the point of contact of the strip 19 with the lower portion of the plates 9 and 11 so that foreign material, such as small particles of dirt and the like, may, after passing through the openings 10, be precipitated to the bottom of the housing thus formed.

The plate 11, in addition to serving as a support for the license plate 9, will also serve as a background for the display mounted on the license plate so that the background will show clearly through the openings 10, thus making the numbers or other display matter mounted on the license plate quite clearly visible when the light bulb 27 is dispensed with or is not lit.

It is believed that the structure of the device will be recognized as one which is durable, easily assembled and cheaply manufactured.

While I have illustrated and described the preferred form of my invention, I do not wish to limit myself to the precise form of structure shown, but desire to avail myself of such variations and modifications as may come within the scope of the appended claims.

Having described my invention what I claim as new and desire to secure by Letters Patent is:

1. A device of the class described comprising a front plate having perforations formed therein determining a definite outline; a rear plate carried by said front plate in spaced relation thereto, and forming a background therefor said rear plate having an opening formed therein; a retaining member mounted on the rear surface of said rear plate surrounding said opening, one edge of said retaining member being offset and spaced from said rear plate, the offset edge having a plurality of notches formed therein; a closure for said opening; a plurality of tongues projecting outwardly from said closure adapted for engaging in the space between said plate and the offset portion of said retaining member, said notches affording entry for said tongues into said space and a light carried by and projecting forwardly from said closure for illuminating said perforations.

2. A device of the class described comprising a front plate having perforations formed therein determining a definite outline; a rear plate carried by and spaced from said front plate, and forming a background therefor said rear plate having a circular opening formed therein; a circular retaining member mounted on the rear surface of said rear plate surrounding said opening, the inner edges of said retaining member being outwardly offset from said plate to provide with said plate a channel, said outwardly offset portion of said retaining member being provided with notches; a closure for said opening; tongues projecting outwardly from said closure adapted for engaging in said channels, said notches affording entry of said tongues into said channels and a light carried by and projecting forwardly from said closure for illuminating said perforations.

3. A device of the class described comprising a front plate having perforations formed therein determining a definite outline; a rear plate carried by and spaced from said front plate, said rear plate having a circular opening formed therein; a circular retaining member mounted on the rear surface of said rear plate surrounding said opening, the inner edges of said retaining member being outwardly offset from said plate to provide with said plate a channel, said outwardly offset portion of said retaining member being provided with notches; a closure for said opening; tongues projecting outwardly from said closure adapted for engaging in said channels, said notches affording entry of said tongues into said channels; and a strip detachably mounted between said plates adjacent the marginal edges thereof for forming with said plates a housing; and a light mounted in said housing for illuminating said perforations.

4. A device of the class described, comprising: a front plate having perforations formed therein determining a definite outline; a rear plate carried by and spaced slightly from said front plate, said rear plate having an opening formed therein; a retaining member mounted on the rear surface of said rear plate surrounding said opening; a closure engaging said retaining member and serving as a closure for said opening, said closure extending at its central portion rearwardly of said rear plate; and a light mounted on the central portion of said closure and projecting forwardly therefrom into said opening and projecting partly into the space between said plates.

5. In combination, a plate having a circular opening formed therein; a retaining member mounted on the rear surface of said plate surrounding said opening, one edge of said retaining member being offset and spaced from said plate, the offset edge having a plurality of notches formed therein; a closure for said opening; a plurality of tongues projecting outwardly from said closure adapted for engaging in the space between said plate and the offset portion of said retaining member, said notches affording entry for said tongues into said space, the central portion of said closure being bulged outwardly from said plate; and a light bulb carried by the outwardly bulged portion of said closure and projecting forwardly therefrom into said opening.

In testimony whereof I have signed the foregoing.

LEO ROTOLE.